United States Patent
Iozia et al.

(10) Patent No.: US 10,994,448 B2
(45) Date of Patent: May 4, 2021

(54) STATION AND METHOD FOR CURING A TREAD STRIP

(71) Applicant: BRIDGESTONE CORPORATION, Tokyo (JP)

(72) Inventors: Francesco Iozia, Rome (IT); Simone Neroni, Rome (IT); Antonio Castaldo, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 69 days.

(21) Appl. No.: 16/484,557

(22) PCT Filed: Mar. 2, 2018

(86) PCT No.: PCT/EP2018/055158
§ 371 (c)(1),
(2) Date: Aug. 8, 2019

(87) PCT Pub. No.: WO2018/162342
PCT Pub. Date: Sep. 13, 2018

(65) Prior Publication Data
US 2020/0009764 A1    Jan. 9, 2020

(30) Foreign Application Priority Data
Mar. 7, 2017    (IT) .......................... 102017000025104

(51) Int. Cl.
*B29C 33/46* (2006.01)
*B29C 35/02* (2006.01)
(Continued)

(52) U.S. Cl.
CPC .............. *B29C 33/46* (2013.01); *B29C 35/02* (2013.01); *B29C 33/424* (2013.01);
(Continued)

(58) Field of Classification Search
CPC ....... B29C 33/424; B29C 33/44; B29C 33/46; B29C 35/02; B29C 37/0003;
(Continued)

(56) References Cited

U.S. PATENT DOCUMENTS 4,076,483 A * 2/1978 Smirne ................... B29C 45/40
                                                        249/68
4,818,203 A * 4/1989 Majerus ............... B29C 45/0003
                                                        156/125
(Continued)

FOREIGN PATENT DOCUMENTS

CN          203496194 U    3/2014
DE    10 2008 055 532 A1   6/2010
(Continued)

OTHER PUBLICATIONS

Written Opinion of the International Search Report of PCT/EP2018/055158 dated May 4, 2018.
(Continued)

*Primary Examiner* — James P Mackey
(74) *Attorney, Agent, or Firm* — Sughrue Mion, PLLC

(57) ABSTRACT

Station (7) and method of curing for a tread strip (2); provided are: a flat curing mold (9) which is composed of a lower shell (10) and an upper cover (11); and an extractor element (17) which is suitable for extracting the cured tread strip (2) from the lower shell (10) after the curing operation; the cured tread strip (2) has a first wall (13), which has a relief design and is in contact with the lower shell (10), and a second wall (14) which is opposite the first wall (13), and is in contact with the upper cover (11); the extractor element (17) is suitable for adhering to the second wall (14) of the tread strip (2) along the entire length of the second wall (14) itself; and the extractor element (17) is movable perpendicularly with respect to the second wall (14) of the tread
(Continued)

strip (2) in order to simultaneously raise the whole tread strip (2) from the lower shell (10).

11 Claims, 16 Drawing Sheets

(51) Int. Cl.
    *B29C 37/00*      (2006.01)
    *B29C 45/40*      (2006.01)
    *B29D 30/52*      (2006.01)
    *B29L 30/00*      (2006.01)
    *B29C 33/42*      (2006.01)
    *B29C 43/50*      (2006.01)

(52) U.S. Cl.
    CPC ...... *B29C 37/0003* (2013.01); *B29C 37/0007* (2013.01); *B29C 2043/5046* (2013.01); *B29C 2045/4084* (2013.01); *B29D 30/52* (2013.01); *B29L 2030/002* (2013.01)

(58) Field of Classification Search
    CPC ........ B29C 2043/5046; B29C 37/0007; B29D 30/52; B29D 30/56
    USPC .................................. 425/437, 443
    See application file for complete search history.

(56) References Cited

U.S. PATENT DOCUMENTS

| | | | |
|---|---|---|---|
| 5,277,727 A | 1/1994 | Seiler et al. | |
| 5,279,784 A * | 1/1994 | Bender | B29D 30/52 156/128.1 |
| 6,368,439 B1 | 4/2002 | Bender et al. | |
| 7,186,103 B2 * | 3/2007 | Menard | B29C 33/44 425/28.1 |
| 7,261,549 B2 * | 8/2007 | Wennberg | B25J 15/0616 425/436 RM |
| 9,174,405 B2 * | 11/2015 | Mangia | B29D 30/0662 |
| 9,969,107 B2 * | 5/2018 | Cress | B29C 33/442 |
| 2004/0197432 A1 | 10/2004 | Menard | |
| 2009/0162465 A1 | 6/2009 | Komornik et al. | |
| 2011/0148001 A1 | 6/2011 | Cress et al. | |

FOREIGN PATENT DOCUMENTS

| | | |
|---|---|---|
| DE | 10 2014 211 805 A1 | 12/2015 |
| JP | 04-259538 A | 9/1992 |
| JP | 07-227858 A | 8/1995 |
| JP | 2002-160928 A | 6/2002 |
| JP | 2012-201037 A | 10/2012 |
| JP | 2014-079978 A | 5/2014 |
| WO | 2004/035286 A1 | 4/2004 |
| WO | 2008/028542 A1 | 3/2008 |
| WO | 2013/136313 A1 | 9/2013 |

OTHER PUBLICATIONS

International Search Report of PCT/EP2018/055158 dated May 4, 2018.

* cited by examiner

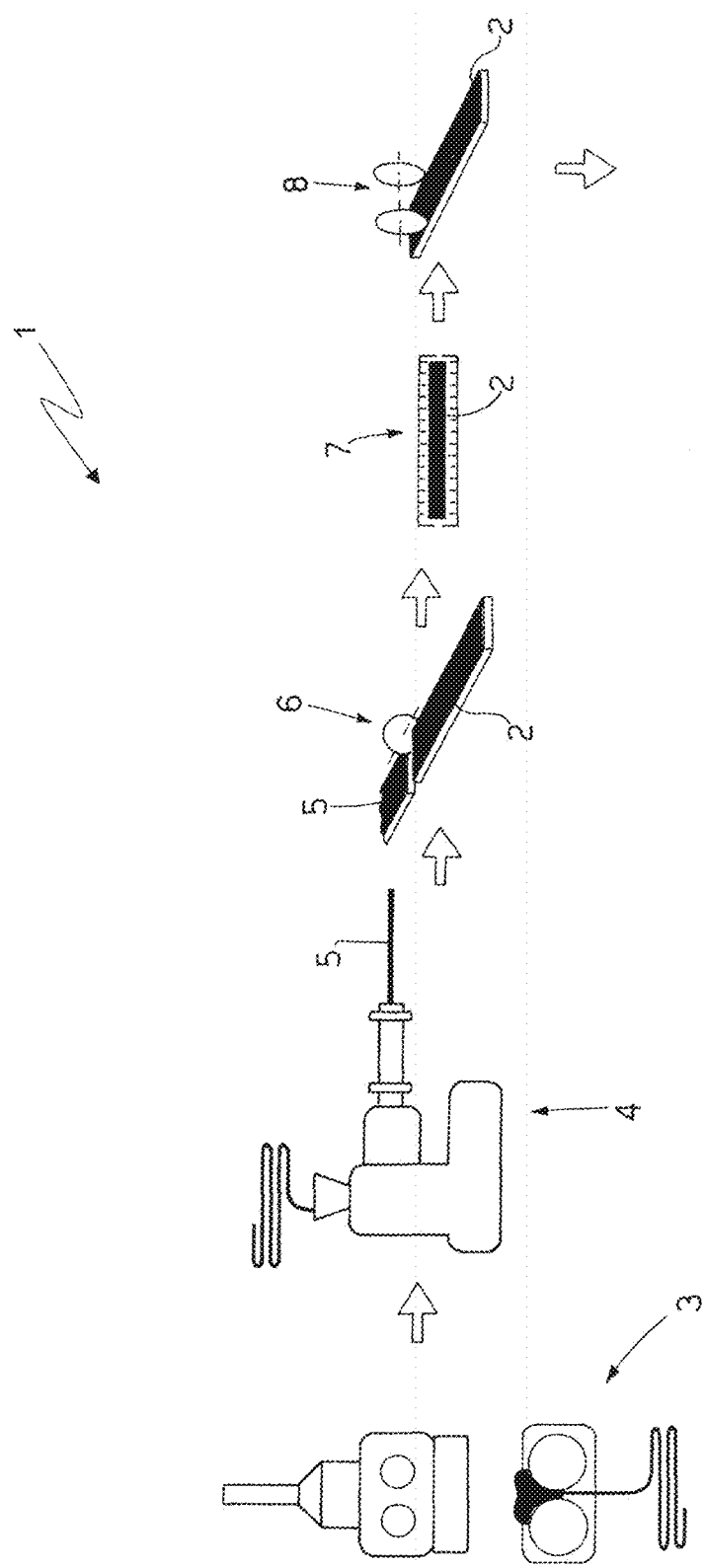

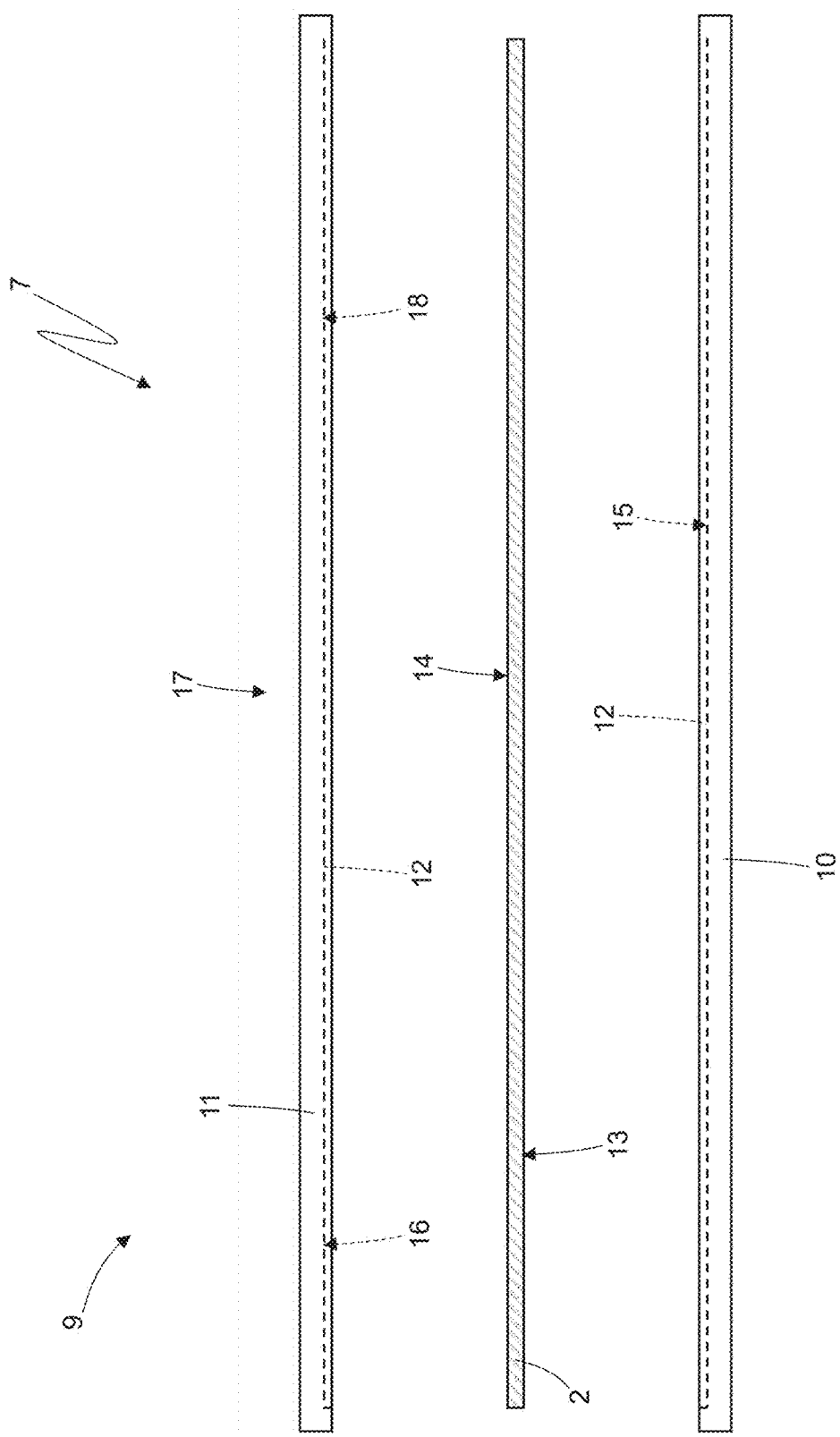

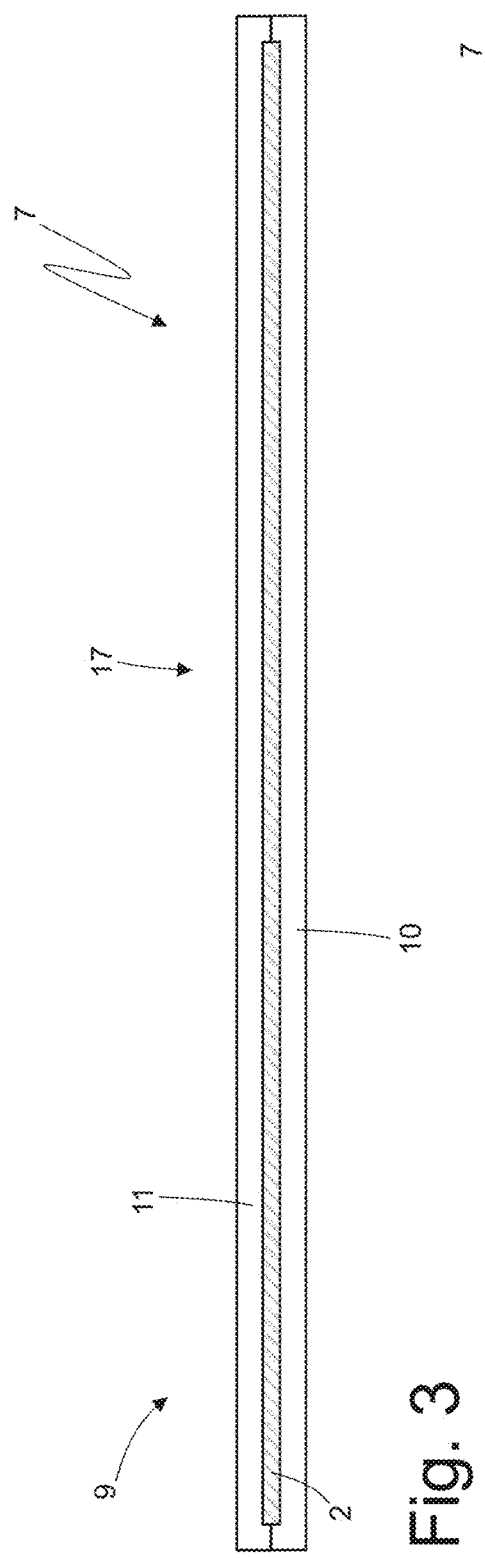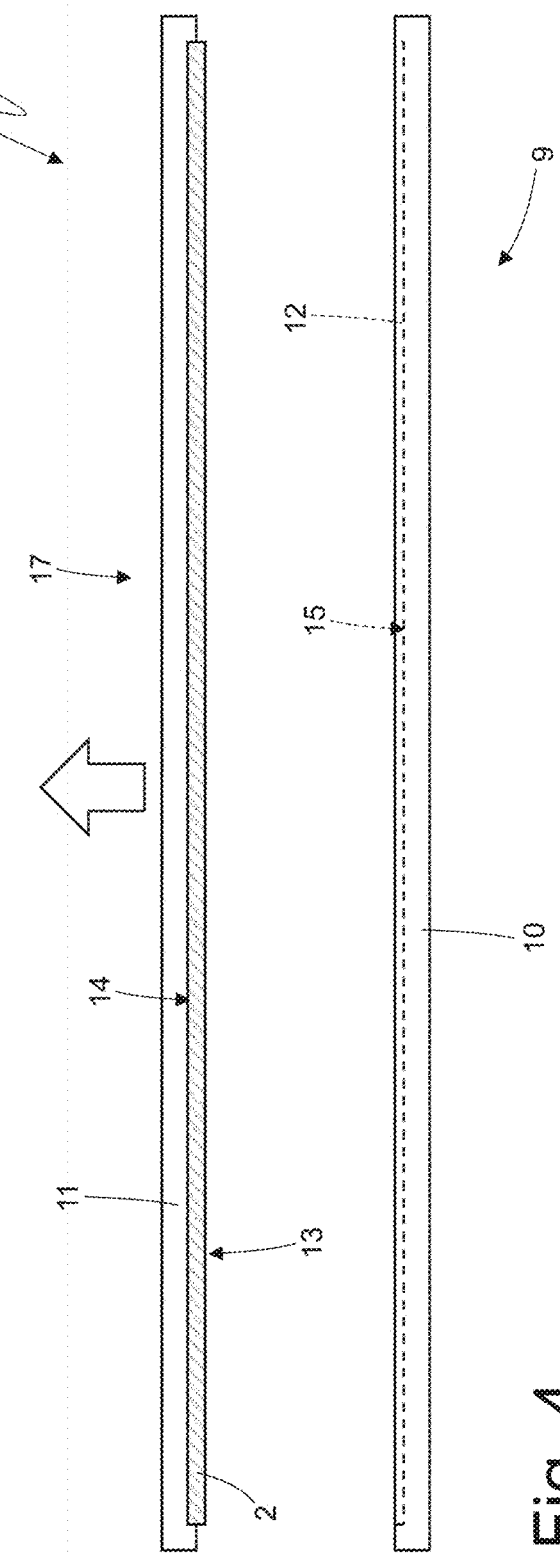

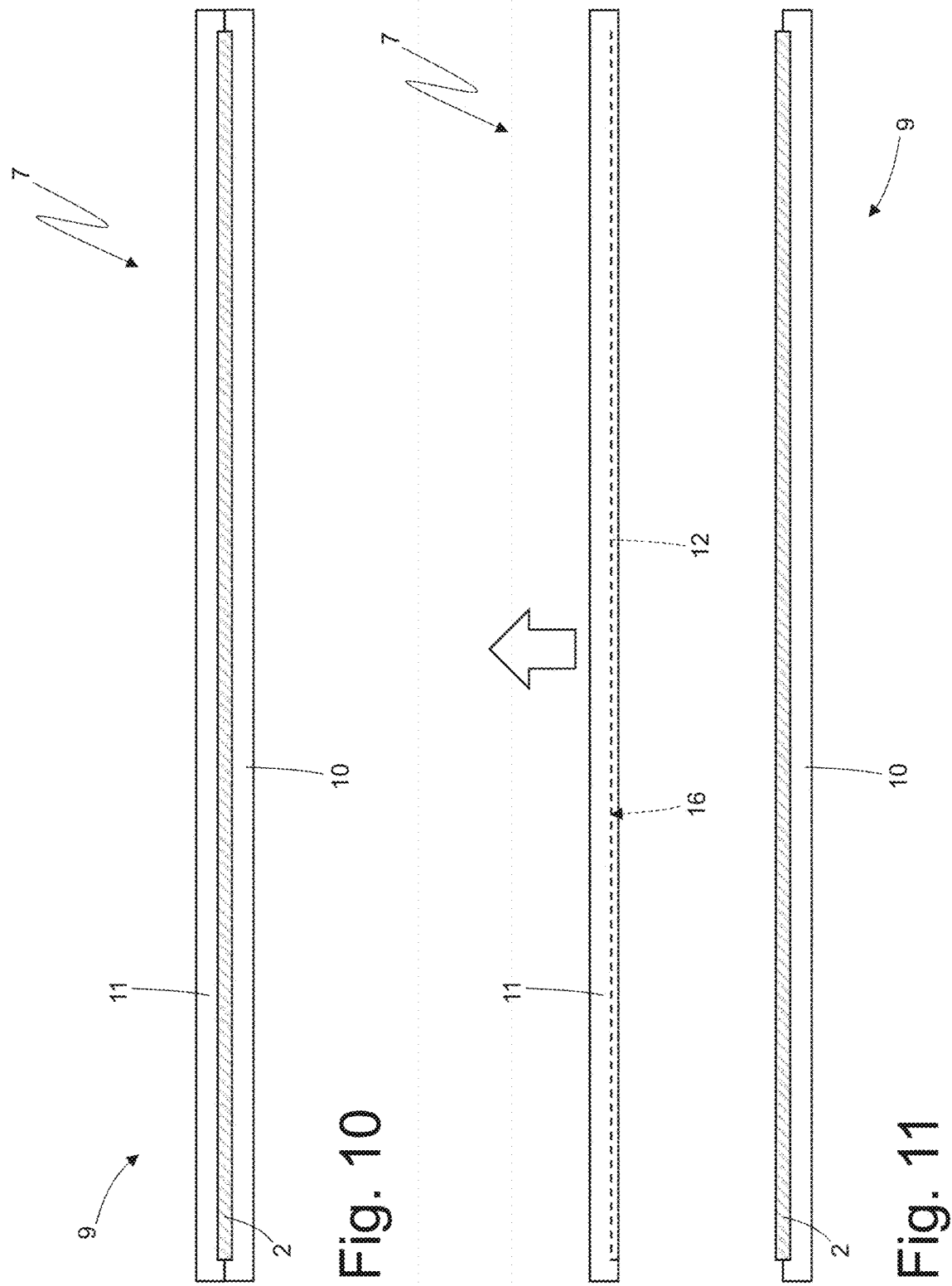

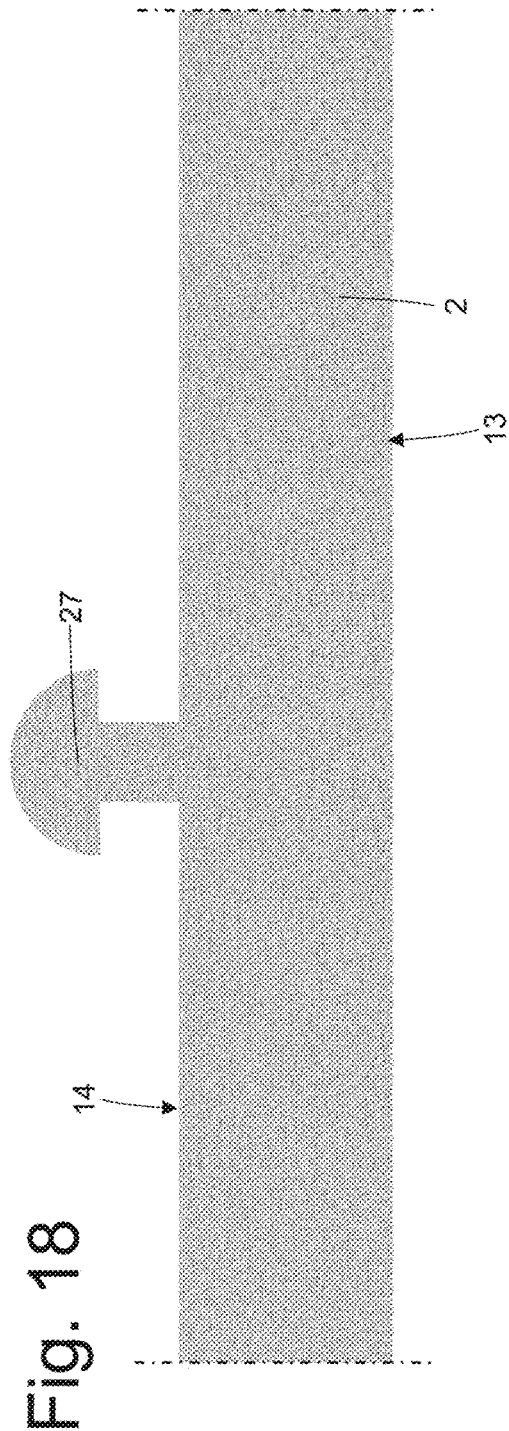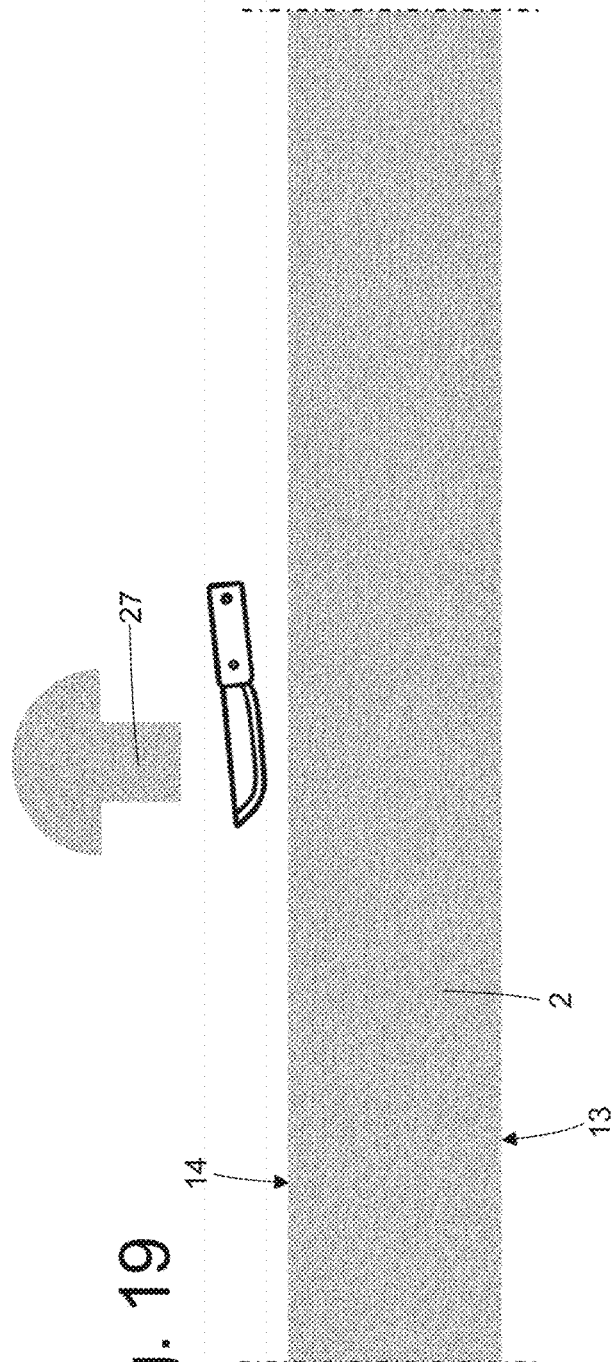

STATION AND METHOD FOR CURING A TREAD STRIP

CROSS REFERENCE TO RELATED APPLICATIONS

This application is a National Stage of International Application No. PCT/EP2018/055158 filed Mar. 2, 2018, claiming priority based on Italian Patent Application No. 102017000025104 filed Mar. 7, 2017.

TECHNICAL SECTOR

The present invention relates to a curing station and a curing method for a tread strip.

PRIOR ART

The cold retreading of a pneumatic tyre provides for the elimination of the worn out old tread from the pneumatic tyre and then the application of a new, already cured tread to the casing of the pneumatic tyre. In particular, both an intermediate strip or cushion of green rubber and a pre-formed and cured tread strip (called PCT strip—Pre-Cured Tread Strip) are wrapped around the casing; then the casing wrapped in the cushion and in the cured tread strip is inserted in a curing autoclave and subjected to a further curing process in order to ensure an optimum adhesion of the tread to the casing by the bonding action of the cushion.

A pre-cured tread strip ready to be applied to the casing of a pneumatic tyre is described in the patent U.S. Pat. No. 5,277,727A1. A station for the cold retreading of a pneumatic tyre according to the methodology described above is described in the patent U.S. Pat. No. 6,368,439B1.

The construction of the pre-cured tread strip provides for the extrusion of a green rubber compound to obtain a continuous band of green tread that is subsequently cut transversally in order to separate a series of green tread strips of the desired length. Each green tread strip is inserted into a flat curing mold in order to undergo a curing process; at the conclusion of the curing process, the cured tread strip must be extracted from the curing mold, unwinding the cured tread strip from those elements of the curing mold that define the design of the tread in negative. In general, the flat curing mold is comprised of a grabbing member that is initially integrated within the curing mold, that engages an extremity of the cured tread strip, and is raised upward and then pulled by a special actuation device in order to ensure progressive extraction of the cured tread strip from the curing mold.

Some examples of the extraction of the cured tread strip from a flat curing mold are described in the questions section of patents US2004197432A1, US2011148001A1 and WO2013136313A1.

During the extraction of a cured tread strip from a flat curing mold, the cured tread strip itself folds over on itself about 180°, at the extraction zone with a relatively small folding radius, subjecting the rubber to increased mechanical stresses that are concentrated in the extraction zone and may result in the formation of cracks (that is, thin and deep slits) that typically start from the grooves of the tread design. Of course, in the event that cracks form, the cured tread strip is unusable and must be discarded.

DESCRIPTION OF THE INVENTION

The object of the present invention is to supply a curing station and a method of curing for a tread strip that are free of the drawbacks described above (namely, they avoid the risk of damaging the cured tread strip during the extraction of the cured tread strip itself from the curing mold) and that, at the same time, can easily and economically be implemented.

According to the present invention, a curing station and a method for the curing of a tread strip are provided as set forth in the appended claims.

BRIEF DESCRIPTION OF THE DRAWINGS

The present invention is now described in reference to the attached drawings, which illustrate several non-limiting exemplary embodiments, wherein:

FIG. 1 schematically illustrates a plant for the implementation of a pre-cured tread strip;

FIG. 2 is a front schematic exploded view of a curing mold of a curing station of the plant of FIG. 1;

FIGS. 3 and 4 are two front and schematic views of the curing station of FIG. 2 at the start and end of the extraction of a cured tread strip from the curing mold;

FIGS. 10-13 are four front and schematic views of an alternative embodiment of the curing station in FIG. 2 during the extraction of a cured tread strip from the curing mold;

FIGS. 18 and 19 are two sectional views of a cured tread strip extracted from the curing mold of FIGS. 16 and 17.

PREFERRED EMBODIMENTS OF THE INVENTION

Figure 5:
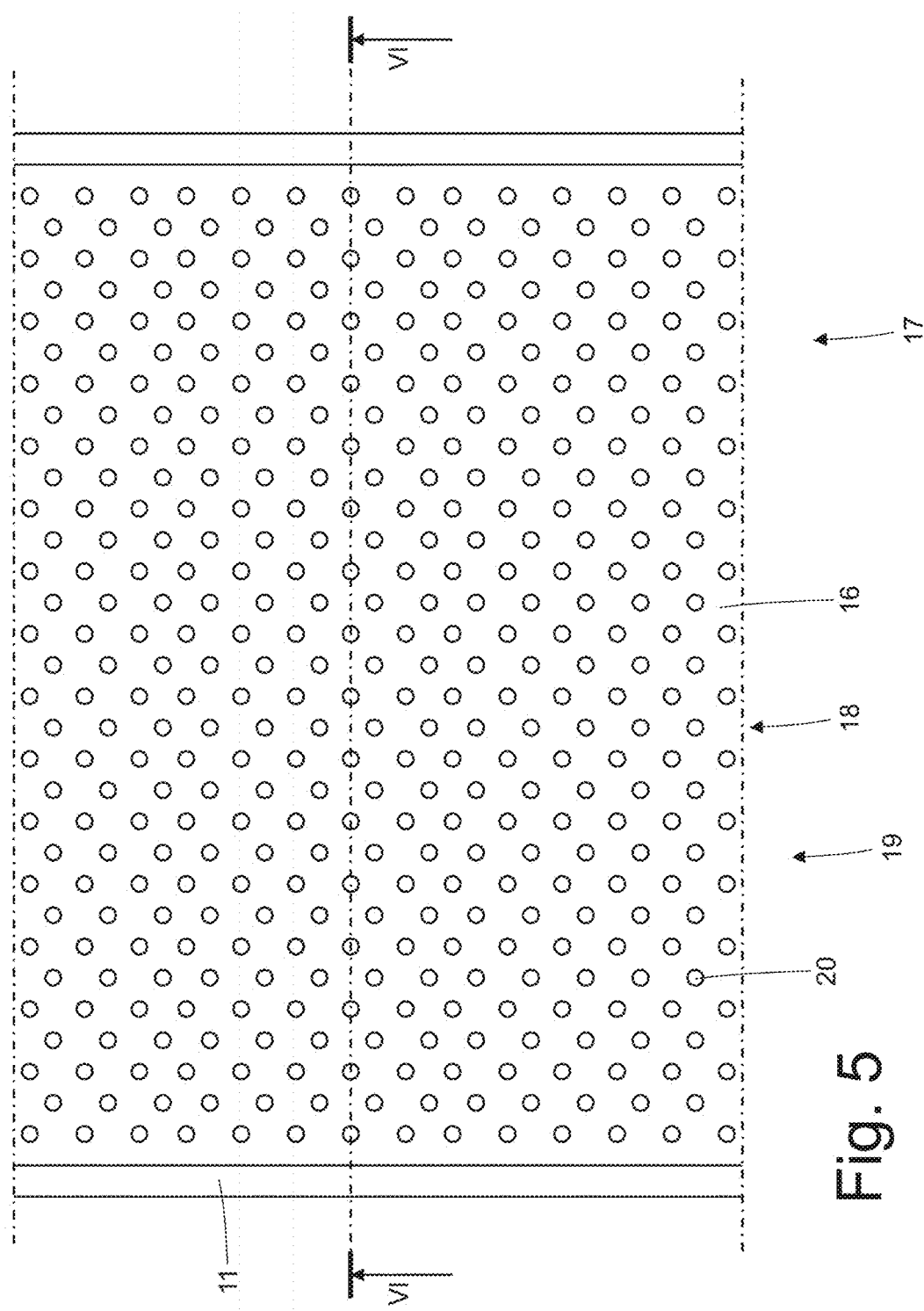
FIG. 5 is a schematic plan view of part of an upper shell of the curing mold of the curing station of FIG. 2.

In FIG. 1, the reference number 1 indicates overall a plant for the realization of tread strips 2 to be utilized in the cold retreading of pneumatic tyres.

The plant 1 comprises a mixing device 3 wherein a green rubber compound is formed that is fed to an extruding device 4 in order to extrude the green rubber compound and obtain a continuous band 5 of green tread. Arranged downstream of the extruding device 4 is a cutting device 6, which separates a series of green tread strips 2 of the desired length from the continuous band 5 of green tread. Arranged downstream of the cutting device 6 is a curing station 7, which carries out the curing of the green tread strips 2 and therefore supplies cured tread strips 2 (which are normally referred to as PCT, which stands for Pre-Cured Tread). Preferably, arranged downstream of the curing station 7 is a trimming device 8 that eliminates the residue generated by the curing process from each cured tread strip 2.

As is illustrated in FIG. 2, the curing station 7 comprises a flat curing mold 9 that has a parallelepiped shape and that is composed of a lower shell 10 and an upper cover 11 that are coupled (joined) in order to close the curing mold 9 and therefore to allow for the execution of the curing process, and that are uncoupled (separated) in order to open the curing mold 9 and then allow for the insertion of a green tread strip 2 into the curing mold 9 or for the extraction of a cured tread strip 2 from the curing mold 9.

Within the interior of the curing mold 9, that is, between the lower shell 10 and the upper cover 11, a cavity 12 is defined that reproduces in negative the final desired shape of the tread strip 2 and that contains the tread strip 2 during the curing process. The cavity 12 is normally (but not required to be) divided into two semi-cavities respectively formed in the lower shell 10 and in the upper cover 11; as an alternative, the cavity 12 could be entirely arranged within the lower shell 10, and, therefore, the upper cover 11 becomes flat.

The tread design is reproduced in negative within the cavity 12 of the lower shell 10 of the curing mold 9, while the cavity 12 of the upper cover 11 is substantially smooth, that is to say, without parts in relief. As illustrated in FIG. 2, the cured tread strip 2 has a wall 13 that exhibits the relief design of the tread and is in contact with the lower shell 10, and a wall 14, which is smooth, is opposite the wall 13 and is in contact with the upper cover 11. In particular, the lower shell 10 of the curing mold 9 comprises an irregular lower surface 15 that reproduces in negative the shape of the tread and determines the shape of the wall 13 of the tread strip 2; moreover, the upper cover 11 of the curing mold 9 comprises a flat upper surface 16, which determines the shape of the wall 14 of the tread strip 2.

At the end of the curing process, the curing mold 9 is opened raising the upper cover 11; the raising of the upper cover 11 can be accomplished by a pure translation movement along a vertical direction of movement that is perpendicular to the tread strip 2, can be accomplished by a rototranslation movement or (a less frequent, but theoretically possible case) can be accomplished by a pure rotational movement.

The curing station 7 comprises an extractor element 17 that is suitable for extracting the cured tread strip 2 from the lower shell 10 once the curing operation is terminated; in the (non-limiting) embodiments illustrated in FIGS. 2-9, the extractor element 17 is integrated into the upper cover 11 of the curing mold 9, that is, the extractor element 17 is of one piece with the upper cover 11.

The extractor element 17 (integrated in this embodiment into the upper cover 11) is suitable for adhering to the wall 14 of the tread strip 2 along the entire length of the wall 14 itself; in other words, the extractor element 17 is suitable for adhering to the entire area of the wall 14 of the tread strip 2. Furthermore, the extractor element 17 (integrated in this embodiment into the upper cover 11) is movable perpendicularly with respect to the wall 14 of the tread strip 2 in order to simultaneously raise the entire tread strip 2) from the lower shell 10 (as illustrated in FIG. 4); in other words, the opening of the upper cover 11 (that is, of the extractor element 17 integrated into the upper cover 11) at the end of the curing process ensures the raising of the entire tread strip 2 from the lower shell 10 all at once. To summarize, the cured tread strip 2 is not extracted a little piece at a time from the lower shell 10 by deformation of the tread strip 2 itself, rather, the tread strip 2 is extracted all in one piece from the lower shell 10 without any type of deformation of the tread strip 2 itself.

As illustrated in FIGS. 5-9, the extractor element 17 (integrated in this embodiment into the upper cover 11) comprises a holding wall 18 that rests against the wall 14 of the tread strip 2; in this embodiment, the holding wall 18 defines the internal surface 16 of the upper cover 11 (integrating the extractor element 17), which rests against the wall 14 of the tread strip 2 during the entire curing process. Furthermore, the extractor element 17 (integrated in this embodiment into the upper cover 11) comprises a grabbing member 19, which is arranged at the holding wall 18 and is suitable for generating a suction that ensures the adhesion by suction of the tread strip 2 to the holding wall 18; in other words, the grabbing member 19 generates a depression (that is, a pressure lower than the atmospheric pressure) at the holding wall 18 that ensures adhesion by suction of the tread strip 2 to the holding wall 18 itself.

Figure 6:
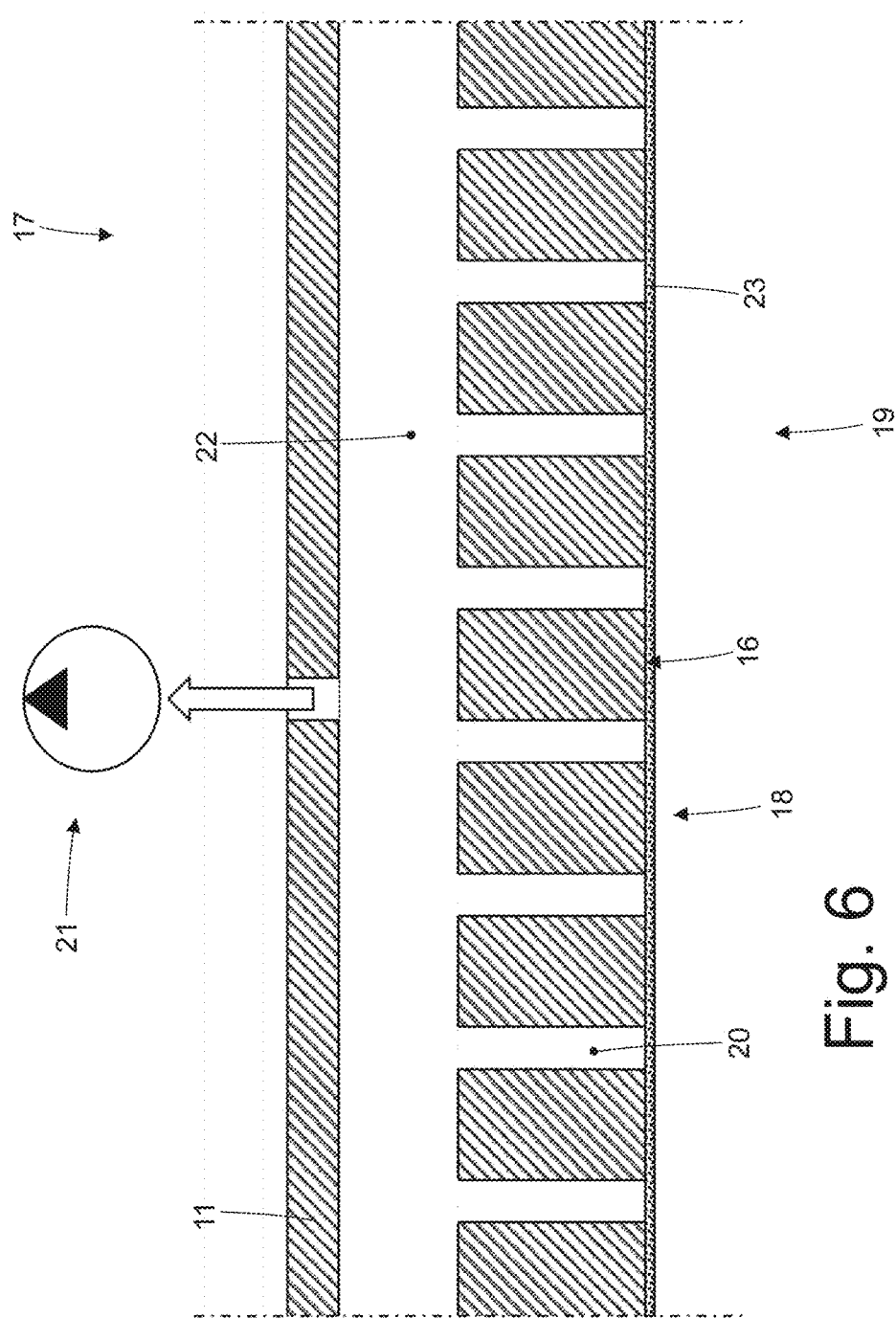
FIG. 6 is a schematic sectional view according to line VI-VI of part of the upper shell of FIG. 5.
Figure 7:
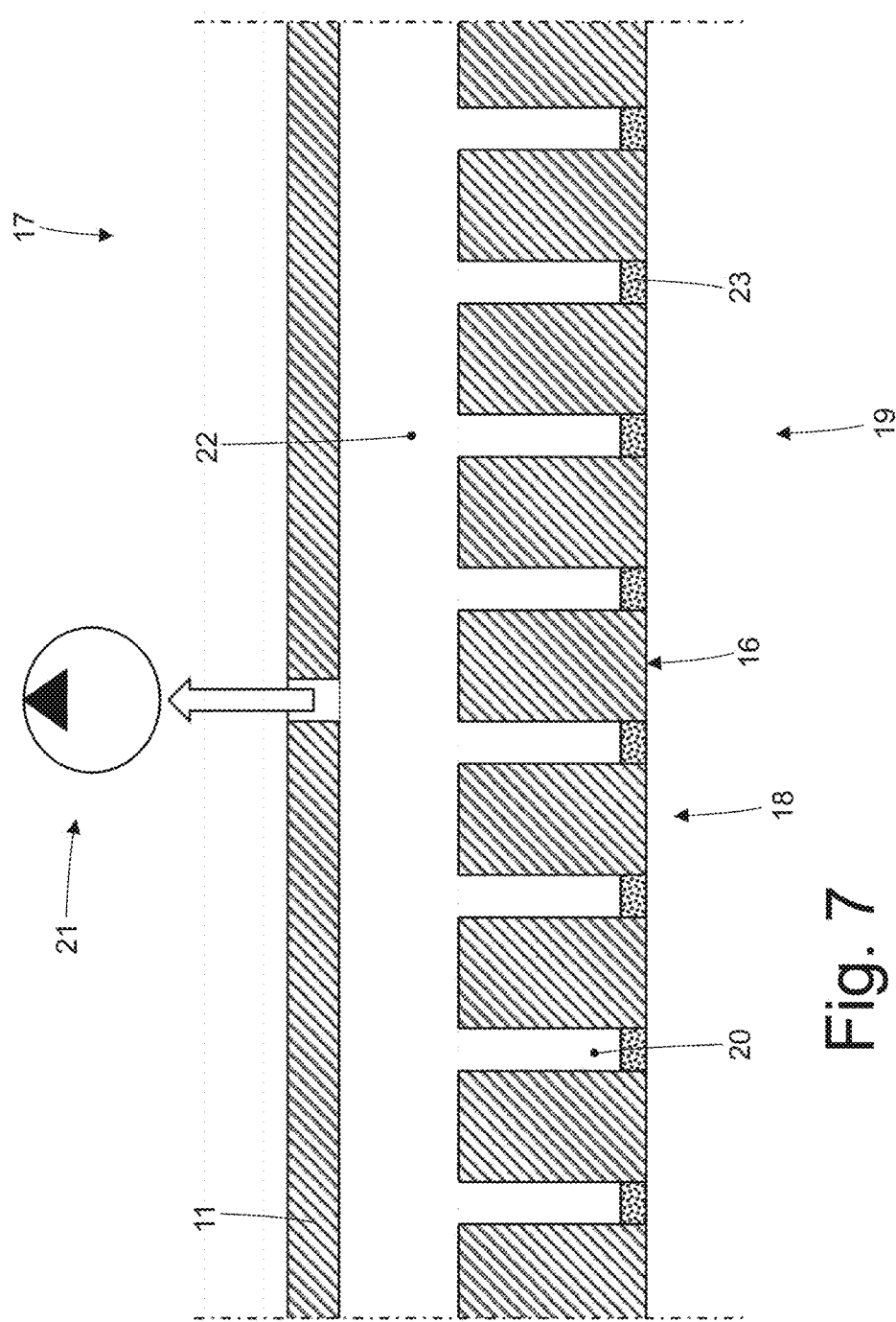
FIG. 7 is a schematic sectional view according to line VI-VI of part of the upper shell of FIG. 5 according to an alternative embodiment.
Figure 8:
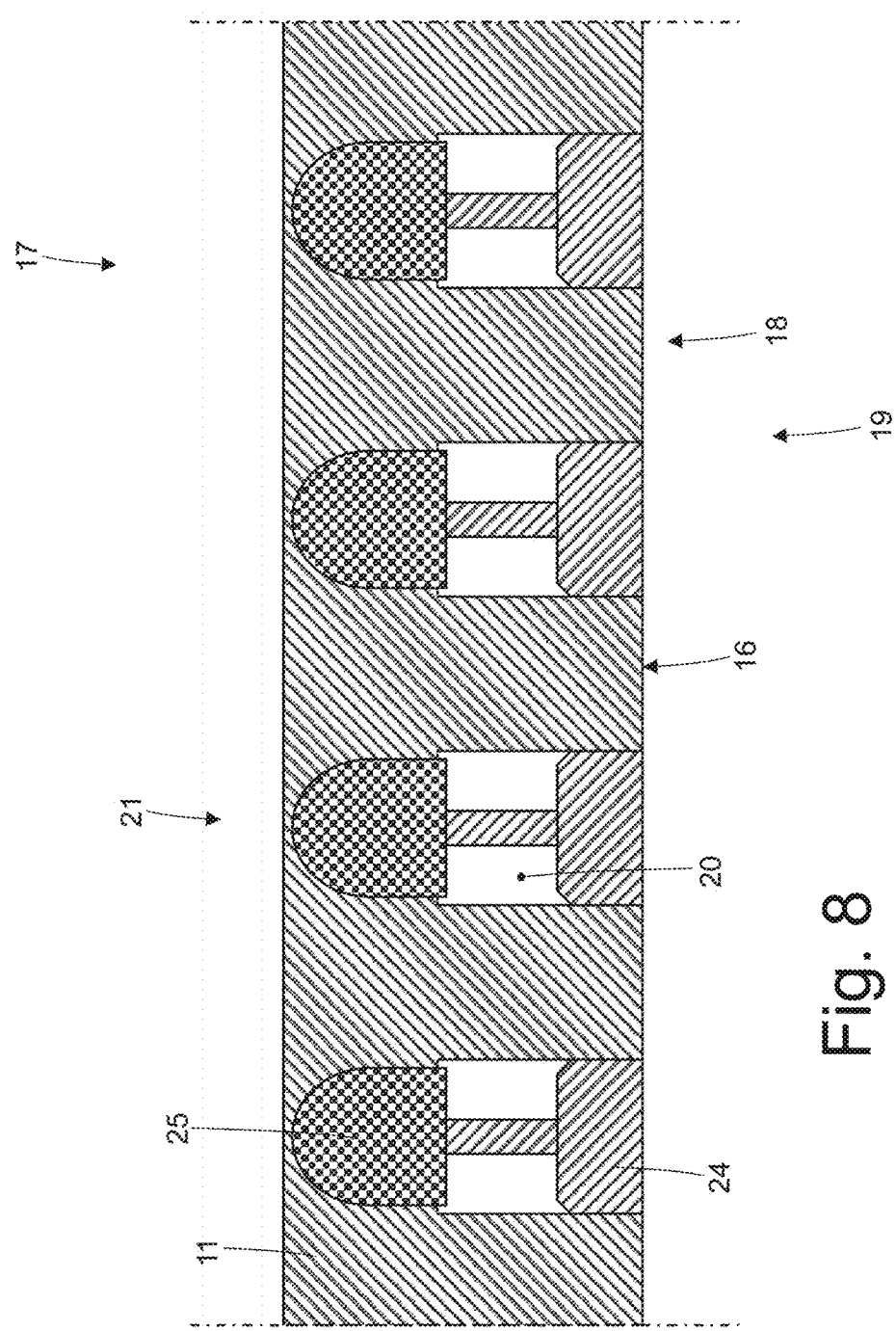
FIGS. 8 and 9 are two schematic sectional views according to line VI-VI of part of the upper shell of FIG. 5 according to a further embodiment, and in two different operating instants.
Figure 9:
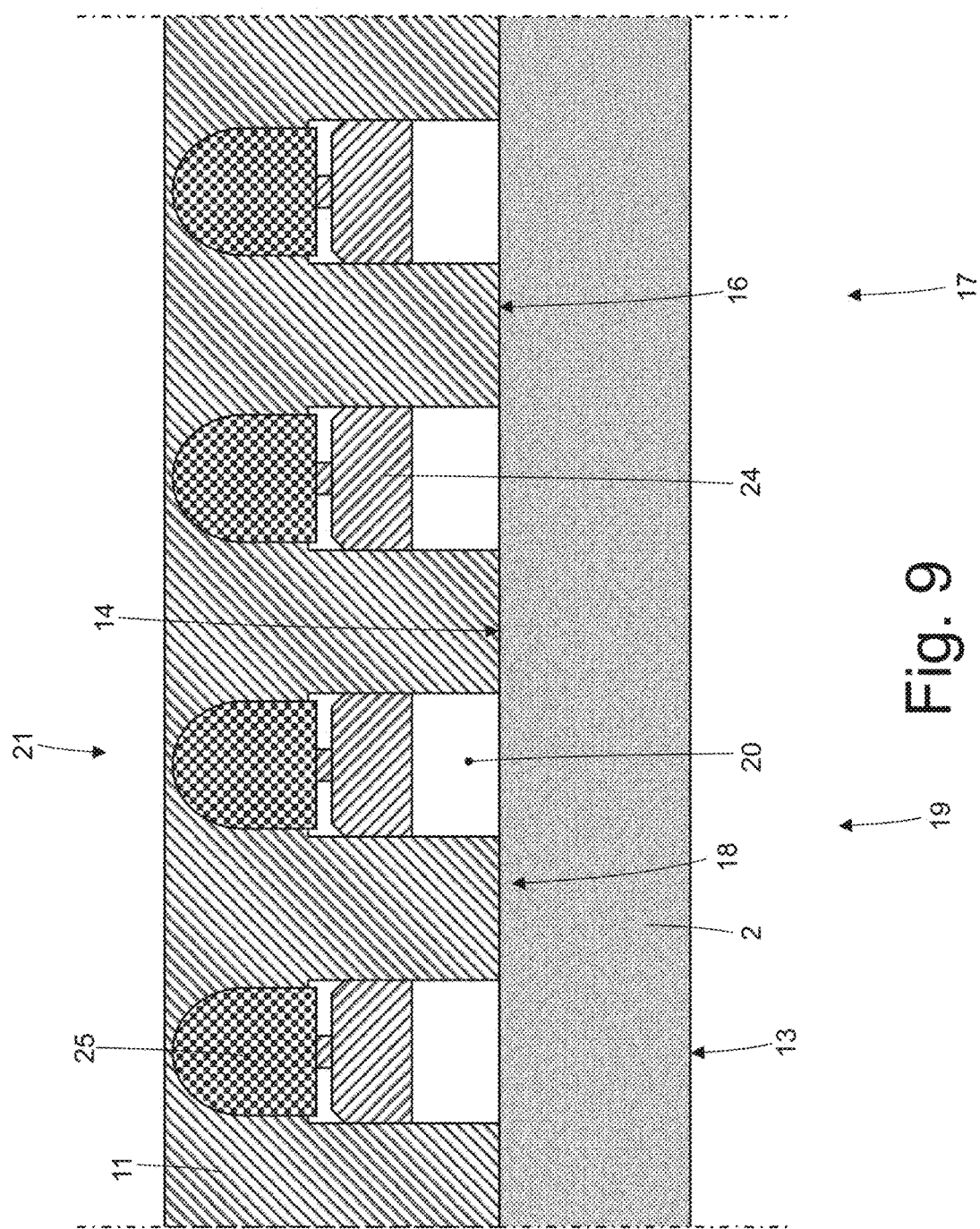

As illustrated in FIGS. 5-9, the grabbing member 19 comprises a plurality of suction holes 20 that open through the holding wall 18 itself and that are connectable to the suction source 21, which may be external (as illustrated in FIGS. 6 and 7) to the extractor element 17 (that is, to the upper cover 11, which incorporates the extractor element 17) or may be internal (as illustrated in FIGS. 8 and 9) to the extractor element 17 (that is, to the upper cover 11, which incorporates the extractor element 17).

As illustrated in FIG. 5, the suction holes 20 are uniformly distributed over the entire area of the holding wall (that is, over the entire internal surface 16 of the upper cover 11, which incorporates the extractor element 17) in such a way that the holding wall 18 can adhere in a complete and uniform way to the wall 14 of the cured tread strip 2.

According to the embodiment illustrated in FIGS. 6 and 7, the suction holes 20 are connected to collector 22, which is formed inside the extractor element 17 (that is, in this embodiment inside the upper cover 11) and is connected to the external suction source 21. According to a preferred embodiment, the grabbing member 19 comprises at least one porous baffle 23 that is permeable to the air and impermeable to the rubber and that is arranged at the suction holes 20 to close the suction holes 20 themselves. In other words, the porous baffle 23 has a plurality of micro-holes that permit the passage of the air, but that do not permit the passage of the rubber. The function of the porous baffle 23 is to prevent the rubber from creeping into the suction holes 20 during the curing process, thereby avoiding the formation of "hairs" (also called "pin vent") on the wall 14 of the tread strip 2; a further function of the porous baffle 23 is to permit the grabbing by suction of the tread strip 2 at the end of the curing process when the tread strip 2 itself must be extracted from the lower shell 10 of the curing mold 9. In other words, the porous baffle 23 must prevent the rubber from entering into the suction holes 20 during the curing process, instead permitting the passage of air through the ventilation holes 20 during the subsequent extraction of the tread strip 2 from the lower shell 10 of the curing mold 9.

In the embodiment illustrated in FIG. 6, a single porous baffle 23 is provided that covers the entire holding wall 18, that is, a single porous baffle 23 covers all of the suction holes 20; according to the alternative embodiment illustrated in FIG. 7, a plurality of porous baffles 23 is provided, each of which is arranged within a corresponding suction hole 20.

According to the embodiment illustrated in FIGS. 8 and 9, the suction source 21 is on the interior of the extractor element 17 (that is, in this embodiment the upper cover 11). In this embodiment, the grabbing member 19 comprises for each suction hole 20 a corresponding piston 24, which is movable in the interior of the suction hole 20 itself in order to locally generate a depression; furthermore, the grabbing member 19 comprises an actuator device 25, which, during the curing process, keeps each piston 24 in a first position in which an external wall of the piston 24 is coplanar with the holding wall 18 (as illustrated in FIG. 8) and at the end of the curing process withdraws each piston 24 into a second position in which the external wall of the piston 24 is spaced apart from the holding wall 18 (as illustrated in FIG. 9). The movement of each piston 24 generates within the corresponding suction hole 20 a depression (or a "vacuum") that makes it possible to grab the cured tread strip 2 by suction.

Indifferently, a single actuator device 25 common to all of the pistons 24 may be provided, or a plurality of actuator devices 25 may be provided, each of which actuates one or more pistons 24.

In the embodiment illustrated in FIGS. 8 and 9, the presence of the porous baffle 23 is not necessary, because during the curing process the holding wall 18 (that is, the internal surface 16) is without holes because the external walls of the pistons 24 are coplanar with the holding wall 18 (as illustrated in FIG. 8).

In the embodiment illustrated in FIGS. 6 and 7, the suction holes 21 are more numerous and smaller (that is, of smaller diameter) because their internal parts are not involved with moving parts; instead, in the embodiment illustrated in FIGS. 8 and 9, the suction holes 21 are less numerous and larger (that is, of larger diameter) because they must be spacious enough to accommodate the pistons 24 in a leak-tight manner.

Inserting the suction source 21 in the extractor element 17 (integrated in this embodiment into the upper cover 11 of the curing mold 9) has the advantage of not requiring the presence of the porous baffle 23; it does however involve a major design complication; in fact, the presence of the porous baffle 23 is problematic because with the passing of the air it leads to losses in pressure that reduce the suction holding force and substantially retard the activation of the suction grab.

Figure 12:
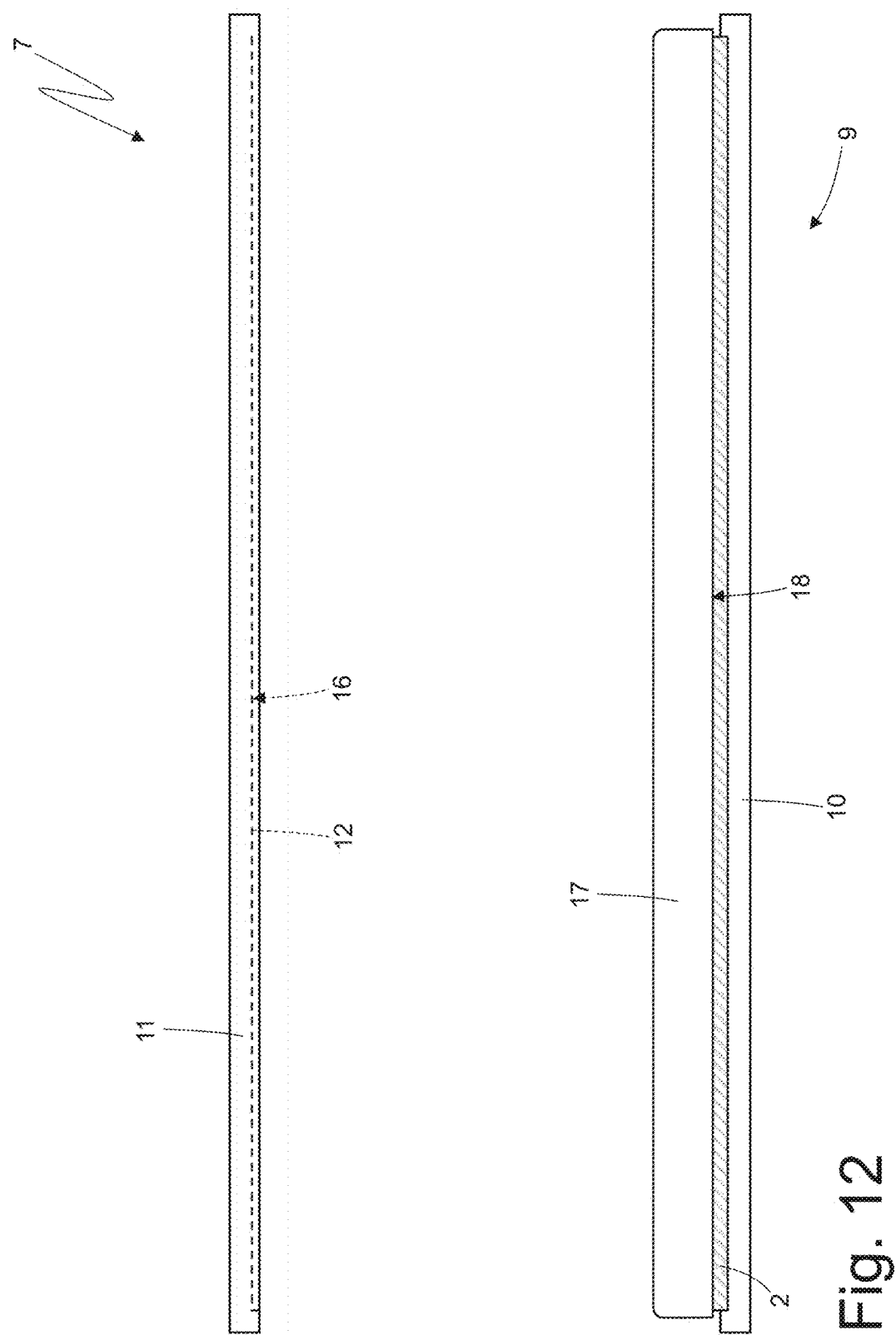
Figure 13:
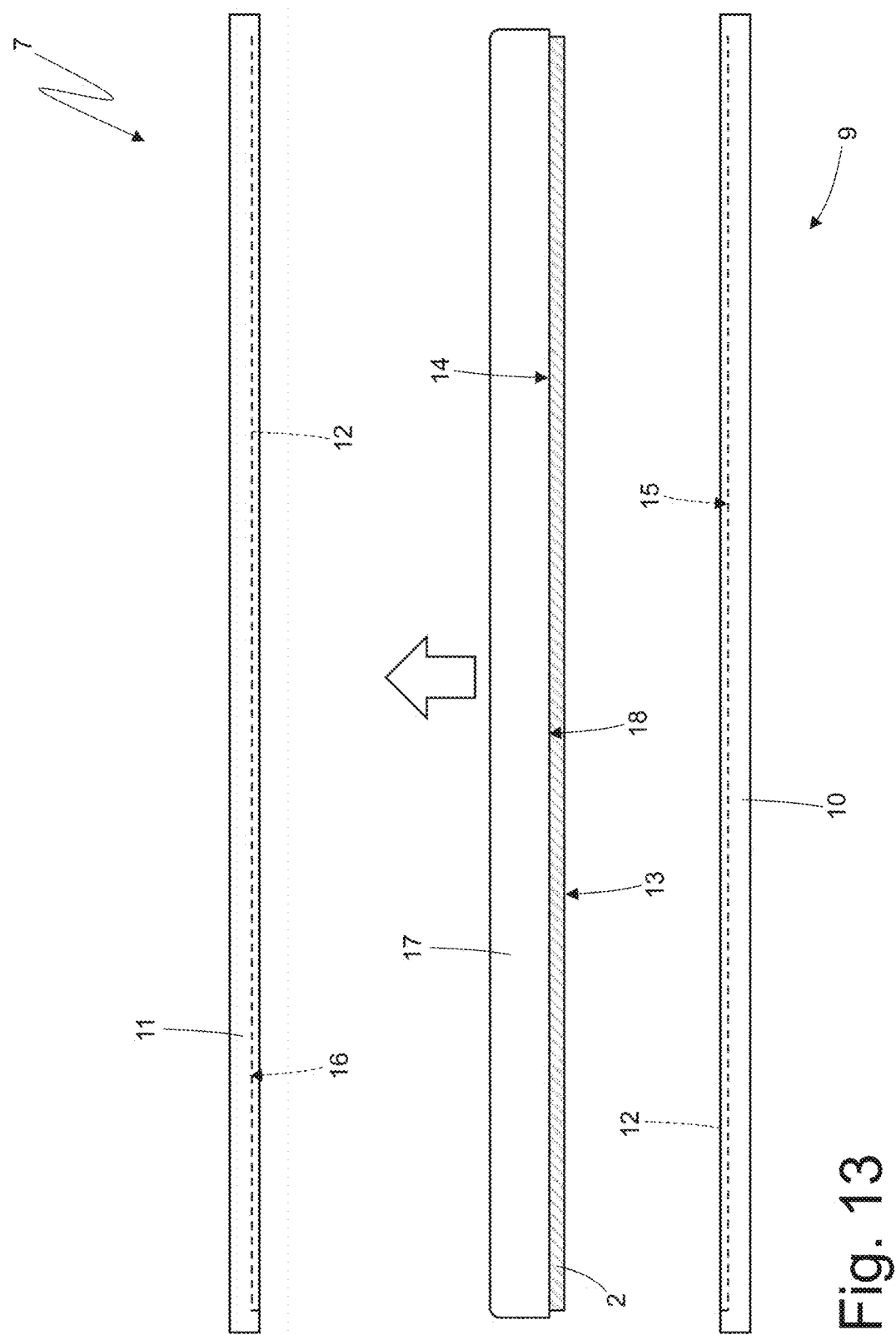

In the embodiments illustrated in FIGS. 5-9, the extractor element 17 is integrated into the upper cover 11 of the curing mold 9, that is, the extractor element 17 is of one piece with the upper cover 11; instead, in the embodiments illustrated in FIGS. 10-15, the extractor element 17 is separate and independent from the upper cover 11 of the curing mold 9. As illustrated in FIGS. 10-13, once the curing process is terminated, the curing mold 9 is opened, raising the upper cover 11 (FIG. 11) and leaving the cured tread strip 2 inside the shell 10; subsequently, the extractor element 17 is rested against the wall 14 of the cured tread strip 2 that is left free and in view by the removal of the upper cover 11 (FIG. 12) and the holding wall 18 of the extractor element 17 is made to adhere by suction to the wall 14 of the cured tread strip 2 (FIG. 12). Finally, the extractor element 17 is raised perpendicularly with respect to the wall 14 of the tread strip 2 in order to simultaneously raise the entire tread strip 2 from the lower shell 10 (FIG. 13); in other words, the raising of the extractor element 17 ensures the contemporaneous raising of the entire tread strip 2 from the lower shell 10. To summarize, the cured tread strip 2 is not extracted a little piece at a time from the lower shell 10 by a deformation of the tread strip 2 itself, rather, the tread strip 2 is extracted all in one piece from the lower shell 10 without any type of deformation of the tread strip 2 itself.

The raising movement of the extractor element 17 can be accomplished by a pure translation movement along a vertical direction of movement that is perpendicular to the tread strip 2, or can be accomplished by a rototranslation movement.

The extractor element 17 may also be utilized to feed the cured tread strip 2 that is extracted from the lower shell 10 of the curing mold 9 to a subsequent wrapping station in which the cured tread strip 2 is wrapped around a casing of a pneumatic tyre to be cold-retreaded; in this case, the extractor element 17 can release the cured tread strip 2 above a conveyor that then forwards the cured tread strip 2 to the wrapping station, or the extractor element 17 can release the cured tread strip 2 directly into the wrapping station.

Figure 14:
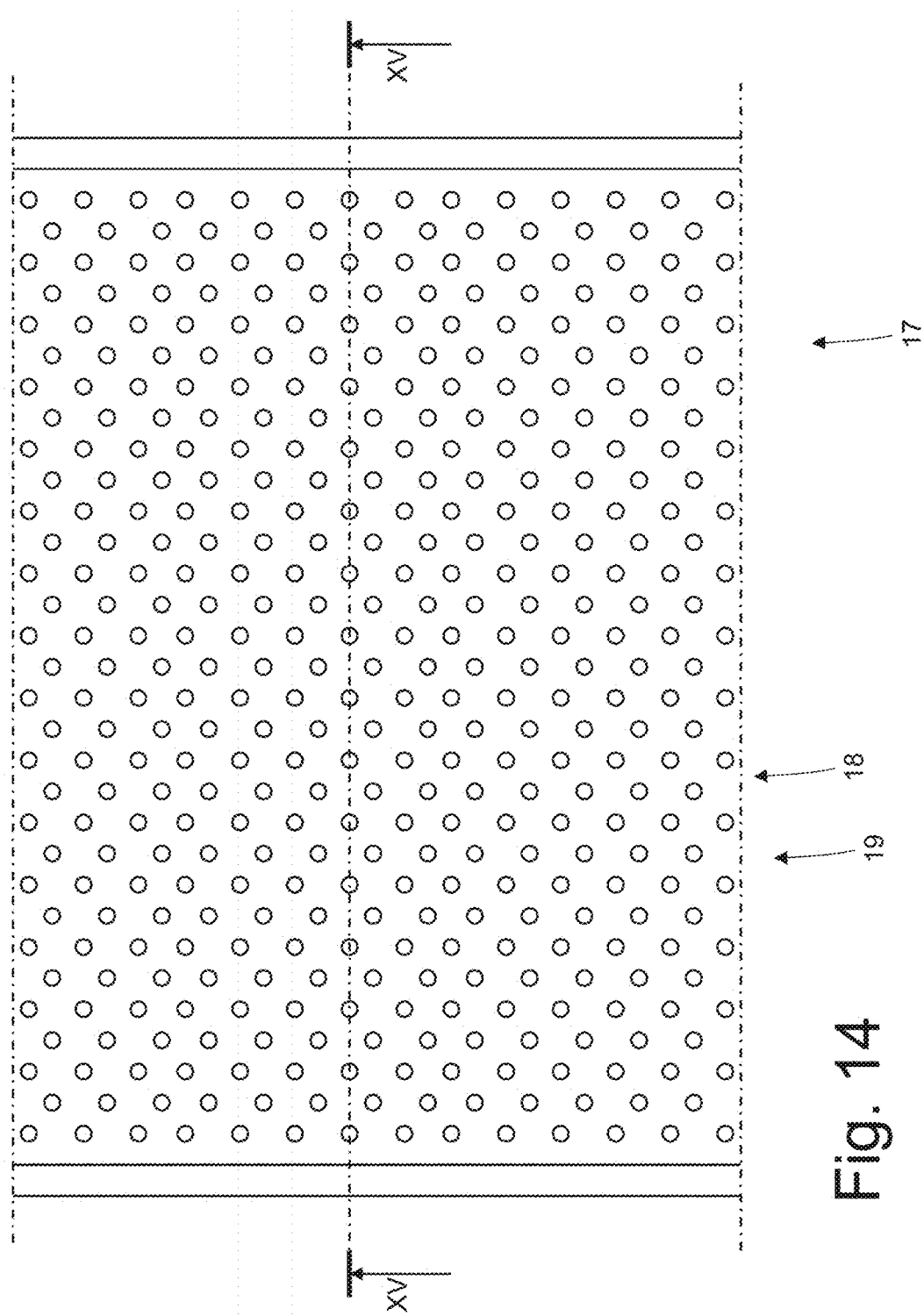
FIG. 14 is a schematic plan view of part of an extractor element of the curing station of FIGS. 10-13.
Figure 15:
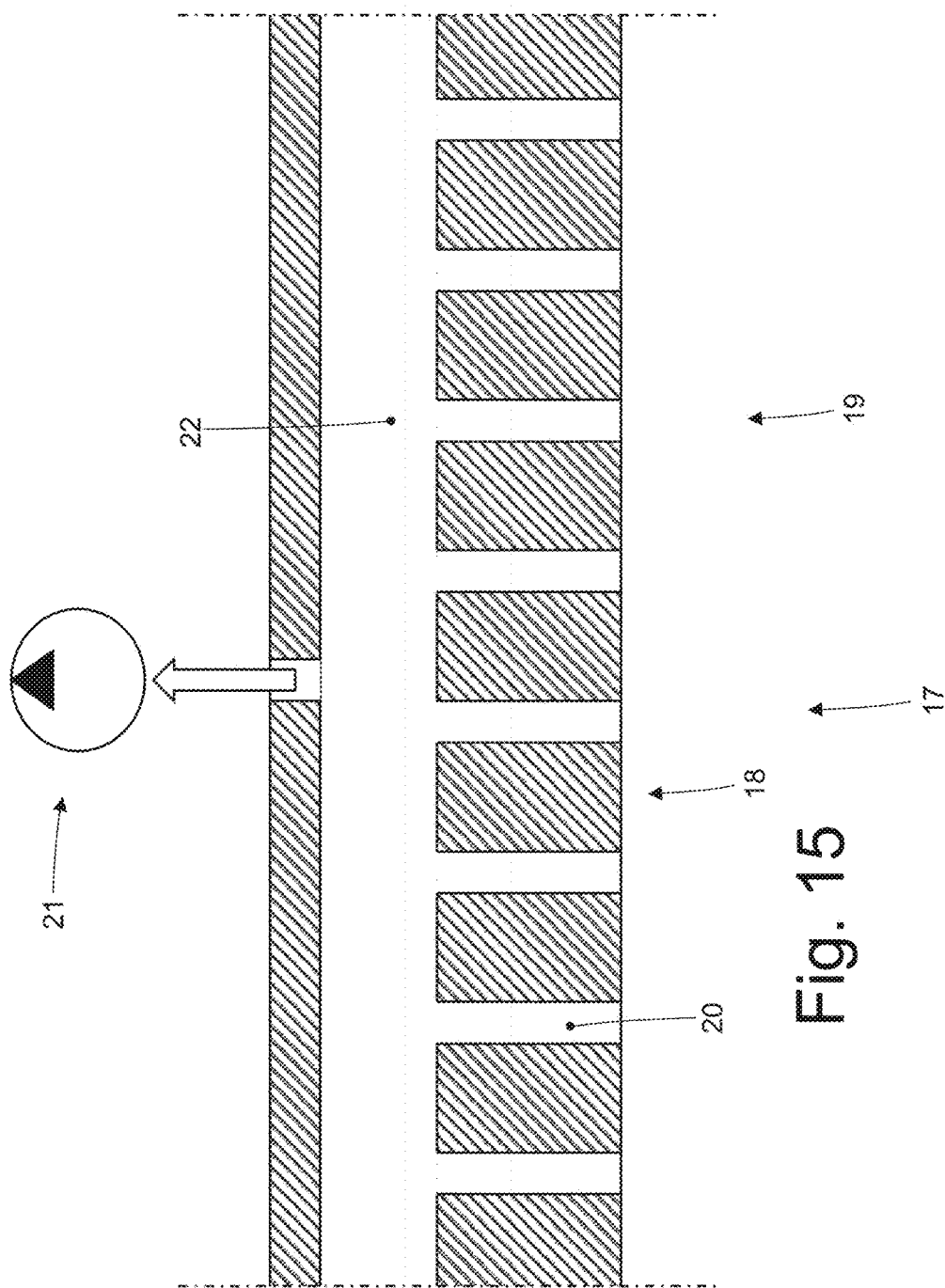
FIG. 15 is a schematic sectional view according to line XV-XV of part of the extractor element of FIG. 14.
Figure 16:
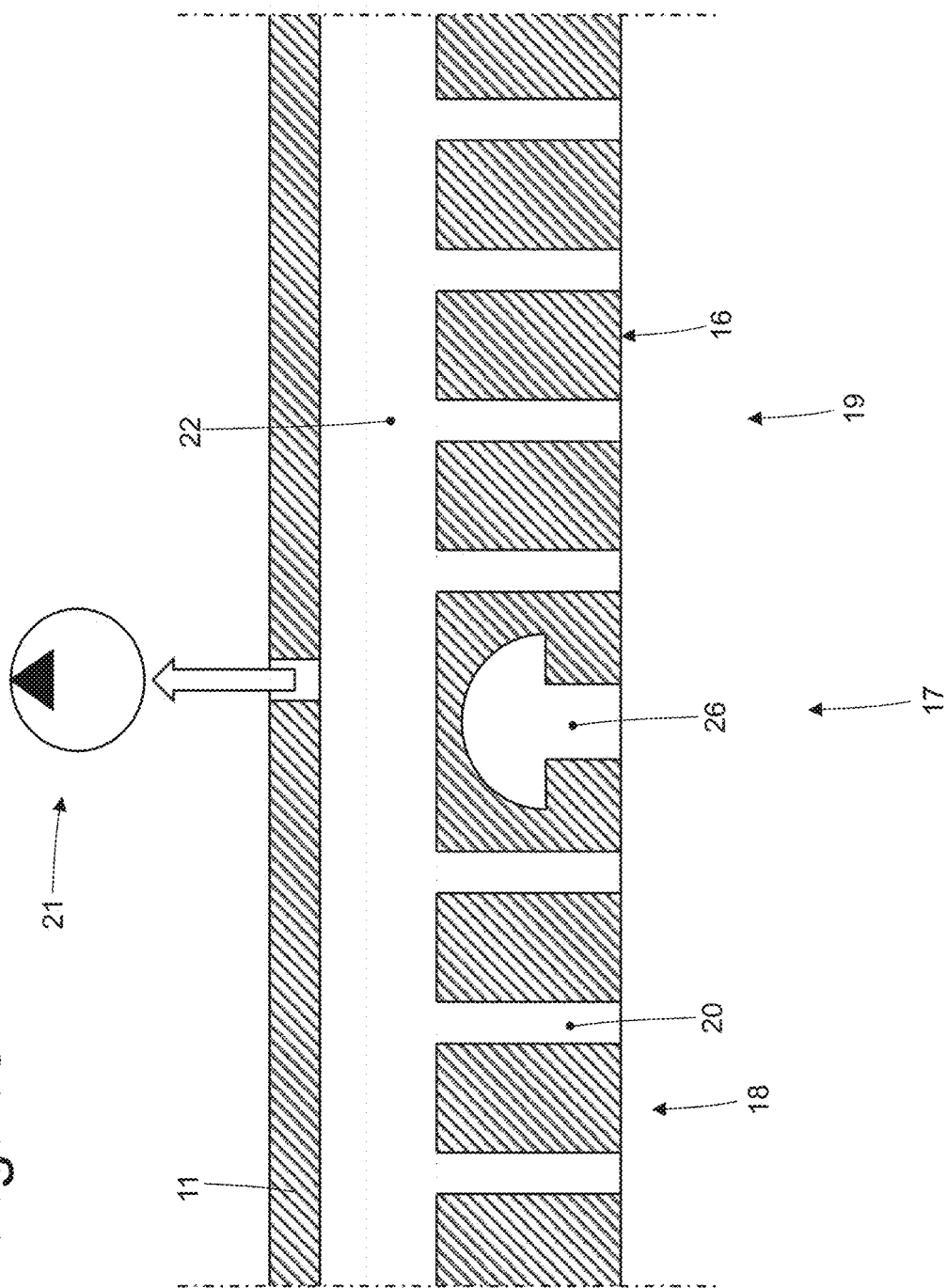
FIGS. 16 and 17 are two schematic sectional views according to line VI-VI of part of the upper shell of FIG. 5 according to another embodiment and in two different operating instants.
Figure 17:
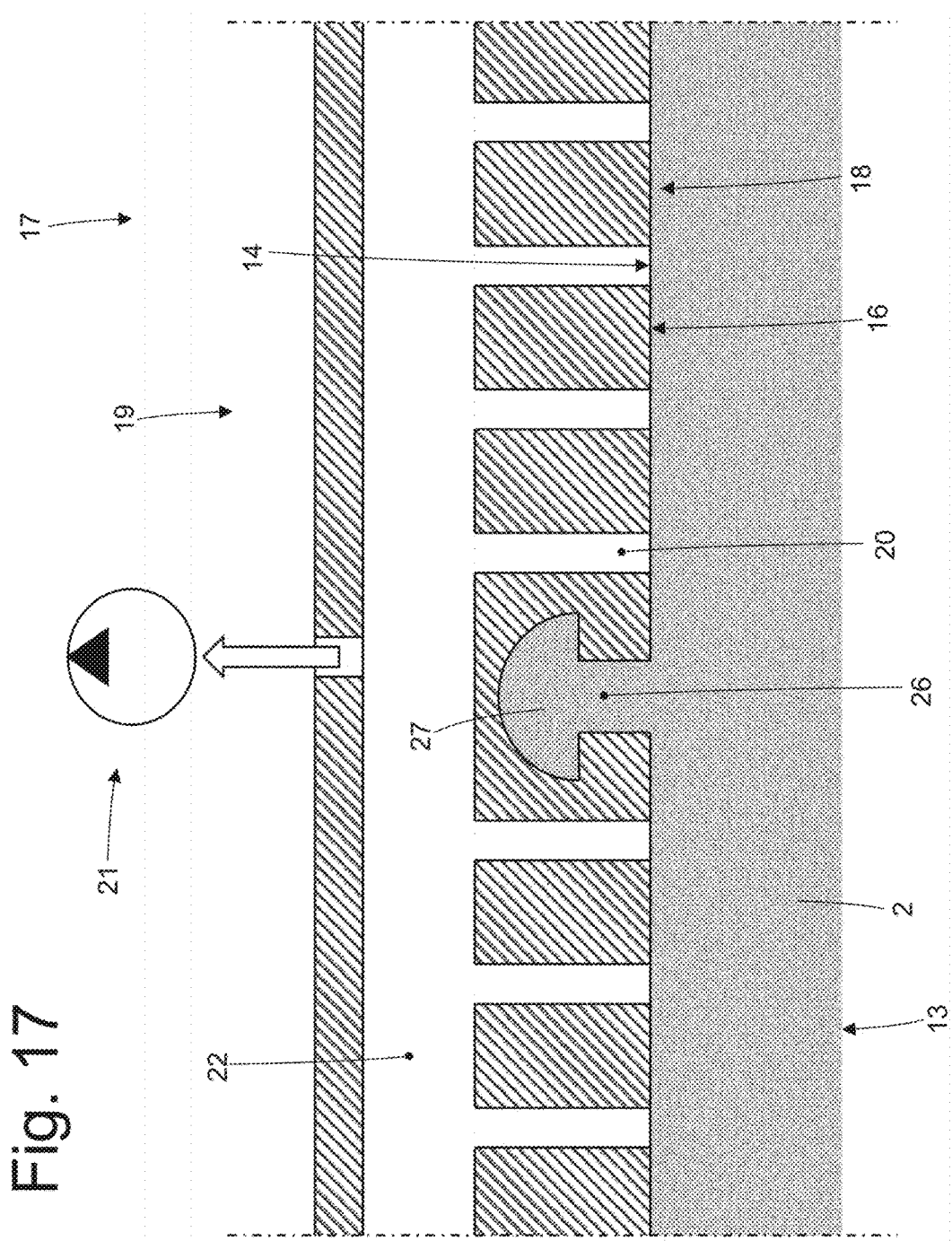

The extractor element 17, which is independent and separate from the upper cover 11 of the curing mold 9 (as illustrated in FIGS. 14 and 15), is altogether analogous to the extractor element 17 integrated into the upper cover 11 of the curing mold 9 (as illustrated in FIGS. 5, 6 and 7) with the one substantial difference that the porous sector 23 is not provided (altogether unhelpful because the extractor element 17 is not involved in the curing process). When the extractor element 17 is independent and separate from the upper cover 11 of the curing mold 9, it is preferable that the suction source 21 is external to the extractor element 17 because such a solution is structurally much simpler (and in any case does not require the porous sector 23).

Illustrated in FIGS. 16-19 is one possible embodiment that is applicable only in the case in which the extractor element 17 is integrated into the upper cover 11 of the curing mold 9; in this embodiment, the holding wall 18 (which is a part of the upper cover 11 that incorporates the extractor element 17) has a plurality of cavities 26, each of which has at least one undercut and is filled with rubber during the curing process in order to create a protuberance 27 of the tread strip 2 that mechanically links the tread strip 2 to the cover 11. The mechanical connection between the cured tread strip 2 and the upper cover 11 (which integrates the extractor element 17) established by the protuberances 27 is utilized to facilitate the extraction of the cured tread strip 2 from the lower shell 10 of the curing mold 9. Once the extraction of the cured tread strip 2 from the lower shell 10 of the curing mold 9 is completed, the cured tread strip 2 is separated from the upper cover 11 of the curing mold 9, applying to the cured tread strip 2 a traction that is strong enough to elastically deform the protuberances 27 in order to force the protuberances 27 to come out of the corresponding cavities 26. Once the tread strip 2 is separated from the upper cover 11 of the curing mold 9, the protuberances 27 are removed (typically cut off using a blade) as illustrated in FIG. 19; in alternatives, the protuberances 27 could also remain in the cured tread strip 2 and therefore become a part of the retread pneumatic tyre by the cured tread strip 2 itself.

The curing station 7 described above offers numerous advantages.

In the first place, in the curing station 7 described above, the extraction of the cured tread strip 2 from the curing mold 9 (in particular from the lower shell 10 of the curing mold 9) is accomplished without subjecting the cured tread strip 2 to appreciable deformations and therefore without running the risk of damaging the cured tread strip 2 itself.

Moreover, the curing station 7 described above is easy and economical to produce because the predisposition of the suctioning extractor element 17 does not involve any design complications (particularly when the suctioning extractor element 17 is separate and independent from the upper cover 11).

The invention claimed is:

1. Station (7) for the curing of a tread strip (2); the curing station (7) comprises:
   a flat curing mold (9) that has a parallelepiped shape and that is composed of a lower shell (10) and an upper cover (11) that are brought together in order to close the curing mold (9) and that are separated in order to open the curing mold (9); and
   an extractor element (17), which is suitable for extracting a cured tread strip (2) from the lower shell (10) once a curing operation has been completed;
   wherein the cured tread strip (2) has a first wall (13), which has a relief design and is in contact with the lower shell (10), and a second wall (14), which is smooth, is opposite the first wall (13) and is in contact with the upper cover (11);
   wherein the extractor element (17) is suitable for adhering to the second wall (14) of the tread strip (2) along the entire length of the second wall (14) itself; and
   the extractor element (17) moves perpendicularly with respect to the second wall (14) of the tread strip (2) in order to simultaneously raise the entire tread strip (2) from the lower shell (10),
   wherein the extractor element (17) comprises a holding wall (18) that rests against the second wall (14) of the tread strip (2) and a grabbing member (19) that is arranged at the holding wall (18) and is suitable for generating suction that ensures the adhesion by suction of the tread strip (2) to the holding wall (18),
   wherein the grabbing member (19) comprises a plurality of suctions holes (20) that open through the holding wall (18) and can be connected to a suction source (21);
   the curing station (7) is characterized in that:
   the extractor element (17) is integrated in the cover (11) and, therefore, the holding wall (18) is part of the cover (11);
   and
   the grabbing member (19) comprises a corresponding piston (24) for each suction hole (20) that is movable in the interior of the suction hole (20) itself to locally generate a depression.

2. Curing station (7) according to claim 1, wherein the grabbing member (19) comprises an actuation device (25) that, during a curing process, maintains each piston (24) in a first position, wherein an external wall of the piston (24) is coplanar with the holding wall (18), and, at an end of the curing process, the actuation device (25) withdraws each piston (24) to a second position, wherein the external wall of the piston (24) is distanced from the holding wall (18).

3. Curing station (7) according to claim 1, wherein:
   the lower shell (10) of the curing mold (9) comprises an irregular lower surface (15), which has a plurality of cavities (26) that reproduce in negative the shape of a tread, and determines the shape of the first wall (13) of the tread strip (2); and
   the upper cover (11) of the curing mold (9) comprises a flat upper surface (16) that determines the shape of the second wall (14) of the tread strip (2).

4. Curing station (7) according to claim 1, wherein the cover (11) comprises the holding wall (18) that rests against the second wall (14) of the tread strip (2) and has at least one cavity (26) that has at least one undercut and that is filled with rubber during a curing process in order to a create a protuberance (27) of the tread strip (2) that mechanically connects the tread strip (2) to the cover (11).

5. Station (7) for the curing of a tread strip (2); the curing station (7) comprises:
   a flat curing mold (9) that has a parallelepiped shape and that is composed of a lower shell (10) and an upper cover (11) that are brought together in order to close the curing mold (9) and that are separated in order to open the curing mold (9); and
   an extractor element (17), which is suitable for extracting the cured tread strip (2) from the lower shell (10) once the curing operation has been completed;
   wherein the cured tread strip (2) has a first wall (13), which has a relief design and is in contact with the lower shell (10), and a second wall (14), which is smooth, is opposite the first wall (13) and is in contact with the upper cover (11);
   wherein the extractor element (17) is suitable for adhering to the second wall (14) of the tread strip (2) along the entire length of the second wall (14) itself; and
   the extractor element (17) moves perpendicularly with respect to the second wall (14) of the tread strip (2) in order to simultaneously raise the entire tread strip (2) from the lower shell (10),
   wherein the extractor element (17) comprises a holding wall (18) that rests against the second wall (14) of the tread strip (2) and a grabbing member (19) that is arranged at the holding wall (18) and is suitable for generating suction that ensures the adhesion by suction of the tread strip (2) to the holding wall (18),
   wherein the grabbing member (19) comprises a plurality of suctions holes (20) that open through the holding wall (18) and can be connected to a suction source (21);
   the curing station (7) is characterized in that:
   the extractor element (17) is integrated in the cover (11) and, therefore, the holding wall (18) is part of the cover (11); and
   the grabbing member (19) comprises at least one porous baffle (23) that is permeable to air and impermeable to rubber and is disposed at the suction holes (20) in order to close the suction holes (20) themselves.

6. Curing station (7) according to claim 5 wherein a single baffle is provided (23) that completely covers the holding wall (18).

7. Curing station (7) according to claim 5, wherein a plurality of porous baffles (23) is provided, each of which is arranged within a corresponding suction hole (20).

8. Curing station (7) according to claim 5, wherein the suction source (21) is external to the extractor element (17).

9. Station (7) for the curing of a tread strip (2); the curing station (7) comprises:
   a flat curing mold (9) that has a parallelepiped shape and that is composed of a lower shell (10) and an upper cover (11) that are brought together in order to close the curing mold (9) and that are separated in order to open the curing mold (9); and
   an extractor element (17), which is suitable for extracting the cured tread strip (2) from the lower shell (10) once the curing operation has been completed;
   wherein the cured tread strip (2) has a first wall (13), which has a relief design and is in contact with the lower shell (10), and a second wall (14), which is smooth, is opposite the first wall (13) and is in contact with the upper cover (11);
   wherein the extractor element (17) is suitable for adhering to the second wall (14) of the tread strip (2) along the entire length of the second wall (14) itself; and
   the extractor element (17) moves perpendicularly with respect to the second wall (14) of the tread strip (2) in order to simultaneously raise the entire tread strip (2) from the lower shell (10), wherein the extractor element (17) comprises a holding wall (18) that rests against the second wall (14) of the tread strip (2) and a grabbing member (19) that is arranged at the holding wall (18) and is suitable for generating suction that ensures the adhesion by suction of the tread strip (2) to the holding wall (18), wherein the grabbing member (19) comprises a plurality of suctions holes (20) that open through the holding wall (18) and can be connected to a suction source (21);

the curing station (7) is characterized in that:

the extractor element (17) is separate and independent from the cover (11) and, therefore, the holding wall (18) is part of the extractor element (17);

and the grabbing member (19) comprises a corresponding piston (24) for each suction hole (20) that is movable in the interior of the suction hole (20) itself to locally generate a depression.

10. Curing method of a tread strip (2); the curing method comprises steps of:

providing a station (7) for the curing of a tread strip (2); the curing station (7) comprises:

a flat curing mold (9) that has a parallelepiped shape and that is composed of a lower shell (10) and an upper cover (11) that are brought together in order to close the curing mold (9) and that are separated in order to open the curing mold (9); and an extractor element (17), which is suitable for extracting a cured tread strip (2) from the lower shell (10) once a curing operation has been completed;

wherein the cured tread strip (2) has a first wall (13), which has a relief design and is in contact with the lower shell (10), and a second wall (14), which is smooth, is opposite the first wall (13) and is in contact with the upper cover (11);

wherein the extractor element (17) is suitable for adhering to the second wall (14) of the tread strip (2) along the entire length of the second wall (14) itself; and the extractor element (17) moves perpendicularly with respect to the second wall (14) of the tread strip (2) in order to simultaneously raise the entire tread strip (2) from the lower shell (10), wherein the extractor element (17) comprises a holding wall (18) that rests against the second wall (14) of the tread strip (2) and a grabbing member (19) that is arranged at the holding wall (18) and is suitable for generating suction that ensures the adhesion by suction of the tread strip (2) to the holding wall (18), wherein the grabbing member (19) comprises a plurality of suctions holes (20) that open through the holding wall (18) and can be connected to a suction source (21);

the curing station (7) is characterized in that:

the extractor element (17) is integrated in the cover (11) and, therefore, the holding wall (18) is part of the cover (11); and the grabbing member (19) comprises a corresponding piston (24) for each suction hole (20) that is movable in the interior of the suction hole (20) itself to locally generate a depression, executing the curing of the tread strip (2) in the flat curing mold (9) that has the parallelepiped shape and that is composed of the lower shell (10) and the upper cover (11) that are brought together in order to close the curing mold (9) and that are separated in order to open the curing mold (9); and extracting the cured tread strip (2) from the lower shell (10) once the curing operation has been completed and by the extractor element (17);

the curing method is characterized in that it comprises the further steps of:

making the extractor element (17) adhere to the second wall (14) of the tread strip (2) along the entire length of the second wall (14) itself; and moving the extractor element (17) perpendicularly with respect to the second wall (14) in order to simultaneously raise the entire tread strip (2) from the lower shell (10).

11. Curing method of a tread strip (2); the curing method comprises steps of:

providing a station (7) for the curing of a tread strip (2); the curing station (7) comprises:

a flat curing mold (9) that has a parallelepiped shape and that is composed of a lower shell (10) and an upper cover (11) that are brought together in order to close the curing mold (9) and that are separated in order to open the curing mold (9); and an extractor element (17), which is suitable for extracting a cured tread strip (2) from the lower shell (10) once a curing operation has been completed;

wherein the cured tread strip (2) has a first wall (13), which has a relief design and is in contact with the lower shell (10), and a second wall (14), which is smooth, is opposite the first wall (13) and is in contact with the upper cover (11);

wherein the extractor element (17) is suitable for adhering to the second wall (14) of the tread strip (2) along the entire length of the second wall (14) itself; and the extractor element (17) moves perpendicularly with respect to the second wall (14) of the tread strip (2) in order to simultaneously raise the entire tread strip (2) from the lower shell (10), wherein the extractor element (17) comprises a holding wall (18) that rests against the second wall (14) of the tread strip (2) and a grabbing member (19) that is arranged at the holding wall (18) and is suitable for generating suction that ensures the adhesion by suction of the tread strip (2) to the holding wall (18), wherein the grabbing member (19) comprises a plurality of suctions holes (20) that open through the holding wall (18) and can be connected to a suction source (21);

the curing station (7) is characterized in that:

the extractor element (17) is integrated in the cover (11) and, therefore, the holding wall (18) is part of the cover (11); and the grabbing member (19) comprises at least one porous baffle (23) that is permeable to air and impermeable to rubber and is disposed at the suction holes (20) in order to close the suction holes (20) themselves, executing the curing of the tread strip (2) in the flat curing mold (9) that has the parallelepiped shape and that is composed of the lower shell (10) and the upper cover (11) that are brought together in order to close the curing mold (9) and that are separated in order to open the curing mold (9); and extracting the cured tread strip (2) from the lower shell (10) once the curing operation has been completed and by the extractor element (17);

the curing method is characterized in that it comprises the further steps of:

making the extractor element (17) adhere to the second wall (14) of the tread strip (2) along the entire length of the second wall (14) itself; and moving the extractor element (17) perpendicularly with respect to the second wall (14) in order to simultaneously raise the entire tread strip (2) from the lower shell (10).

\* \* \* \* \*